United States Patent
Hishinuma et al.

(10) Patent No.: US 10,635,910 B2
(45) Date of Patent: Apr. 28, 2020

(54) MALFUNCTION DIAGNOSIS APPARATUS

(71) Applicant: TRANSTRON INC, Yokohama-shi, Kanagawa (JP)

(72) Inventors: Yoshiaki Hishinuma, Kawasaki (JP); Naoyuki Urushizaki, Yokohama (JP); Hirokazu Sugita, Inagi (JP); Kazuhiko Kobayashi, Fujisawa (JP)

(73) Assignee: TRANSTRON INC, Yokohama-Shi (JP)

( * ) Notice: Subject to any disclaimer, the term of this patent is extended or adjusted under 35 U.S.C. 154(b) by 132 days.

(21) Appl. No.: 15/202,527

(22) Filed: Jul. 5, 2016

(65) Prior Publication Data
US 2017/0011271 A1    Jan. 12, 2017

(30) Foreign Application Priority Data
Jul. 6, 2015 (JP) .................. 2015-134975

(51) Int. Cl.
*G06K 9/00* (2006.01)
*B60W 40/00* (2006.01)
(Continued)

(52) U.S. Cl.
CPC ......... *G06K 9/00798* (2013.01); *B60W 40/00* (2013.01); *G06F 3/00* (2013.01); *G06F 11/00* (2013.01); *G06T 7/90* (2017.01); *H04N 17/002* (2013.01); *H04N 5/20* (2013.01); *H04N 5/2351* (2013.01)

(58) Field of Classification Search
None
See application file for complete search history.

(56) References Cited

U.S. PATENT DOCUMENTS

2005/0152581 A1    7/2005  Hoki et al.
2006/0221226 A1*  10/2006  Yanof .................. H04N 5/3572
                                                            348/346

(Continued)

FOREIGN PATENT DOCUMENTS

JP    2005-033680 A    2/2005
JP    2007-049359      2/2007
(Continued)

OTHER PUBLICATIONS

EESR for European Patent Application No. 16177210.8 dated Dec. 9, 2016.
(Continued)

*Primary Examiner* — James M Anderson, II
(74) *Attorney, Agent, or Firm* — Maschoff Brennan

(57) ABSTRACT

This malfunction diagnosis apparatus detects a line on a road surface by distinguishing the line from an asphalt surface other than the line. The malfunction diagnosis apparatus sets a first area corresponding to the line and a second area corresponding to the asphalt surface using a first image captured while the line is detected. The malfunction diagnosis apparatus calculates a first brightness in the first area and a second brightness in the second area using a second image captured while the vehicle is cruising and the line is not detected. Further, the malfunction diagnosis apparatus diagnoses the malfunction based on at least one of the first brightness and the second brightness.

11 Claims, 6 Drawing Sheets

(51) Int. Cl.
  *G06T 7/90*   (2017.01)
  *H04N 17/00*  (2006.01)
  *G06F 11/00*  (2006.01)
  *G06F 3/00*   (2006.01)
  *H04N 5/20*   (2006.01)
  *H04N 5/235*  (2006.01)

(56) References Cited

U.S. PATENT DOCUMENTS

2006/0239509 A1  10/2006  Saito
2012/0162424 A1   6/2012  Murao et al.

FOREIGN PATENT DOCUMENTS

| JP | WO 2014148161 A1 * | 9/2014 | ........... G06T 7/0002 |
| JP | 2014-187496 A | 10/2014 | |
| WO | 2014/148161 A1 | 9/2014 | |

OTHER PUBLICATIONS

Office Action of EP Patent Application No. 16 177 210.8 dated Jul. 24, 2018.
EP Office Action of Patent Application No. 16 177 210.8 dated Jun. 28, 2019.

* cited by examiner

MALFUNCTION DIAGNOSIS APPARATUS

CROSS-REFERENCE TO RELATED APPLICATION

This application is based upon and claims the benefit of priority of the prior Japanese Patent Application No. 2015-134975, filed on Jul. 6, 2015, the entire contents of which are incorporated herein by reference.

FIELD

The present invention relates to a malfunction diagnosis apparatus diagnosing a malfunction in a system for processing an image captured by an on-board camera.

BACKGROUND

In recent years, an image processing system recognizing a situation around a vehicle by applying analysis processing to an image captured by an on-board camera has been developed as one of preventive safety techniques for preventing an occurrence of a vehicle accident in advance. The image processing system recognizes lines on the road surface (such as a white line and a yellow line), other vehicles, obstacles, road signs, and the like. These recognition results are notified and announced to passengers, or these recognition results are reflected in automatic cruise control, automatic brake control, automatic pilot control, and the like, so that the cruise state of the vehicle is controlled.

By the way, the brightness (the luminance) of an image captured by an on-board camera fluctuates with a shooting time and a cruise environment. For this reason, the image processing system carries out exposure control to correct the brightness of the captured image. For example, in a situation where the illuminance in an image-capturing range is high (in the daytime in the fine weather, under backlight situation, and the like), the image processing system controls exposure time, aperture, sensitivity, and the like to decrease the exposure. On the contrary, in a situation where the illuminance is low (at night, or in the tunnel), the image processing system controls these to increase the exposure.

On the other hand, in a case where a failure occurs in the exposure control due to a malfunction in the on-board camera, it is difficult to recognize target included in an image accurately, and the recognition accuracy may be reduced. Therefore, various techniques have been considered to determine whether the exposure control of the on-board camera is appropriate or not. For example, a method has been suggested to separately provide an illuminance sensor detecting an external illuminance outside of the vehicle and compare the external illuminance and the brightness of the vehicle body portion in the image captured by the on-board camera to determine whether there is a malfunction or not. A method has been suggested to determine whether there is a malfunction or not on the basis of the light quantity of the road surface calculated in view of the exposure time and the exposure gain of the on-board camera (see JP 2005-33680 A, JP 2014-187496 A).

However, in accordance with the above conventional methods, it is difficult to improve the diagnosis accuracy for diagnosing malfunctions. For example, the brightness of the vehicle body portion in the image captured by the on-board camera changes in accordance with not only the external illuminance but also the type of the painting, the surface treatment, the state of dirt, and the like of the surface of the vehicle body. The light quantity of the road surface also changes in accordance with the luminance, the construction state, and the like of the road surface. Therefore, a malfunction may be falsely determined to occur in the image processing system even though the exposure control of the on-board camera is appropriate, and this may reduce the diagnosis accuracy for diagnosing malfunctions.

SUMMARY

A malfunction diagnosis apparatus according to the disclosure is a malfunction diagnosis apparatus for diagnosing a malfunction of a system for processing an image captured by an on-board camera. The malfunction diagnosis apparatus includes a processor to perform procedure including from (A) to (D).
(A) detecting a line on a road surface by distinguishing the line from an asphalt surface other than the line.
(B) setting a first area corresponding to the line and a second area corresponding to the asphalt surface using a first image captured while the line is detected.
(C) calculating a first brightness in the first area and a second brightness in the second area using a second image captured while a vehicle is cruising and the line is not detected.
(D) diagnosing the malfunction based on at least one of the first brightness and the second brightness.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A malfunction diagnosis apparatus serving as an embodiment will be explained with reference to drawings. However, the embodiment illustrated below is merely an example, and it is not intended to exclude various modifications and application of techniques not illustrated in the embodiment. More specifically, the present embodiment can be carried out by making various modifications (by combining the embodiments, the modifications, and the like) without deviating from the gist of the present embodiment. In the following explanation, a white line and a yellow line on the road surface (which are section lines of a cruising region, such as a road center line, a lane separation line, a road outside line, and the like) will be simply referred to as "a line" or "lines".

[1. Vehicle]

The malfunction diagnosis apparatus according to the present embodiment is applied to an image processing system provided on a vehicle 20. This image processing system uses an on-board camera 21 to capture an image around the vehicle, and uses the image recognition apparatus 10 to apply analysis processing to the image, so that the image processing system recognizes a recognition target object around the vehicle. The recognition target object referred to herein includes, for example, a line on the road surface, other vehicles, obstacles, persons, road signs, and the like. Any given method can be employed as a specific method of image recognition with the image recognition apparatus 10, and any publicly known method may be employed. For example, exposure control, filter processing, binary processing, and the like for correcting the brightness of the image obtained by the on-board camera 21 are applied, and thereafter edge detection processing, color analysis processing, pattern matching processing, and the like are applied, so that the existence, the type, the position, the behavior, and the like of the recognition target object are recognized.

Figure 1:
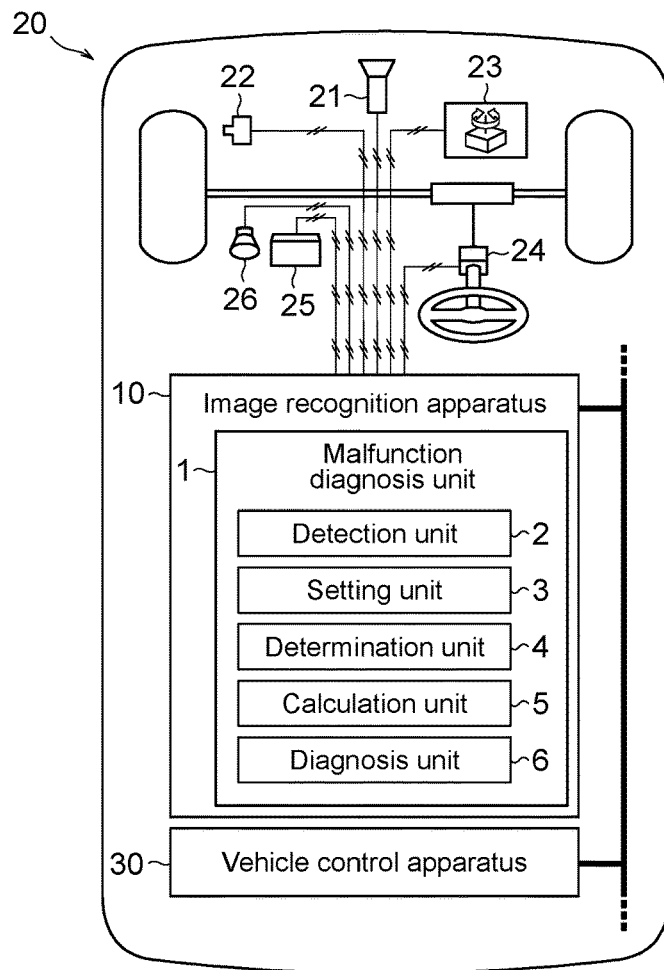
FIG. 1 is a figure for illustrating an example of a configuration of a vehicle to which a malfunction diagnosis apparatus is applied.

The image recognition apparatus 10 is implemented with the functions for a malfunction diagnosis apparatus for diagnosing a malfunction in the image processing system. A portion carrying out this function will be referred to as a malfunction diagnosis unit 1, and is illustrated in FIG. 1. The malfunction diagnosis unit 1 may be achieved with hardware (electronic control circuit), or may be achieved with software processed in the image recognition apparatus 10, or may be achieved by using both of the hardware and the software. The malfunction diagnosis unit 1 according to the present embodiment is implemented with software (malfunction diagnosis program).

The vehicle 20 is provided with not only the on-board camera 21 but also a vehicle speed sensor 22, a yaw rate sensor 23, a steering angle sensor 24, a display 25, a speaker 26, and a vehicle control apparatus 30. The on-board camera 21 is an image capturing apparatus having an image-capturing device [CCD (Charge-Coupled Device), CMOS (Complementary Metal-Oxide-Semiconductor) and the like] for capturing an image around the vehicle 20. In this case, an image including a road surface around the vehicle 20 is captured, and the captured image (image data) is transmitted to the image recognition apparatus 10. The vehicle speed sensor 22, the yaw rate sensor 23, and the steering angle sensor 24 are sensors for detecting the vehicle speed, the yaw rate, and the steering angle, respectively, of the vehicle 20. The vehicle information is transmitted to the image recognition apparatus 10, and is used for determining the cruise state of the vehicle 20.

The display 25 and the speaker 26 are output apparatuses of the image recognition apparatus 10, and a recognition result and a malfunction diagnosis result of the image recognition apparatus 10 are output to these output apparatuses. In a case where the vehicle 20 is provided with a car navigation system, a car audio system, a multimedia system, and the like, a general-purpose video display apparatus and a general-purpose audio output apparatus included in these systems may be used instead of the display 25 and the speaker 26 or in addition to the display 25 and the speaker 26.

The vehicle control apparatus 30 is an electronic control apparatus for controlling various kinds of apparatuses provided on the vehicle 20. The vehicle control apparatus 30 includes, for example, an engine control apparatus, a brake control apparatus, a transmission control apparatus, a suspension control apparatus, a vehicle body posture control apparatus, and the like. This vehicle control apparatus 30 is connected via an on-board communication network with an image recognition apparatus 10 so as to be able to communicate with each other. Therefore, recognition results of the image recognition apparatus 10 can be used for various kinds of controls of the vehicle 20.

[2. Hardware]

Figure 2:
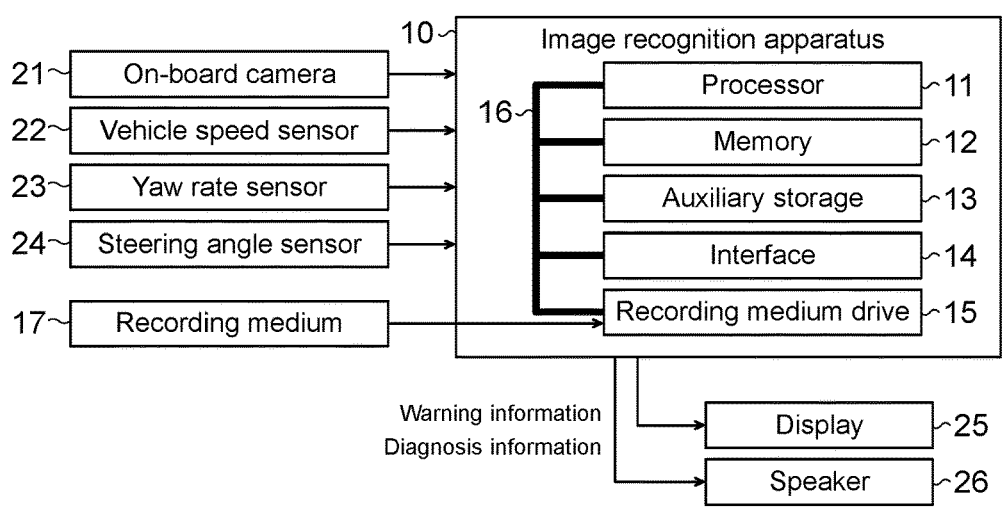
FIG. 2 is a figure for illustrating an example of a configuration of hardware of the malfunction diagnosis apparatus.

FIG. 2 is a figure for illustrating an example of a configuration of hardware of the image recognition apparatus 10. The image recognition apparatus 10 includes a processor 11, a memory 12 (a main memory, a main storage apparatus), an auxiliary storage apparatus 13, an interface apparatus 14, a recording medium drive 15, and the like, which are communicatively connected with each other via an internal bus 16. These apparatuses 11 to 15 operate while receiving electric power from an electric power source (for example, an on-board battery, a button battery, and the like), not illustrated.

The processor 11 is central processing unit including a control unit (control circuit), a calculation unit (a calculation circuit), a cache memory (register group), and the like. The memory 12 is a storage apparatus storing a program and a work data, and, for example, the memory 12 includes a ROM (Read Only Memory) and a RAM (Random Access Memory). On the other hand, the auxiliary storage apparatus 13 is a memory apparatus storing data and programs held for a longer period of time than those in the memory 12, and, for example, the auxiliary storage apparatus 13 includes a nonvolatile memory such as a flash memory, an EEPROM (Electrically Erasable Programmable Read-Only Memory), and the like.

The interface apparatus 14 controls input and output (Input and Output; I/O) between the image recognition apparatus 10 and the outside. The image recognition apparatus 10 is connected via the interface apparatus 14 to an on-board network circuit. Alternatively, the image recognition apparatus 10 is connected via the interface apparatus 14 to the on-board camera 21 and various kinds of sensors 22 to 24 provided on the vehicle 20. Exchange of information between the on-board camera 21, various kinds of sensors 22 to 24, the vehicle control apparatus 30, and the image recognition apparatus 10 is performed via the interface apparatus 14. The recording medium drive 15 is a reading apparatus for reading information recorded (or saved) in a recording medium 17 (removable medium) such as an optical disk and a semiconductor memory.

The program of the control carried out in the image recognition apparatus 10 may be recorded (or saved) in, for example, the memory 12, or may be recorded (or saved) in the auxiliary storage apparatus 13. Alternatively, a program may be recorded (or saved) on the recording medium 17. The image recognition apparatus 10 may read information written in the recording medium 17 via the interface apparatus 14 and the recording medium drive 15.

[3. Malfunction Diagnosis Unit]

Figure 3:
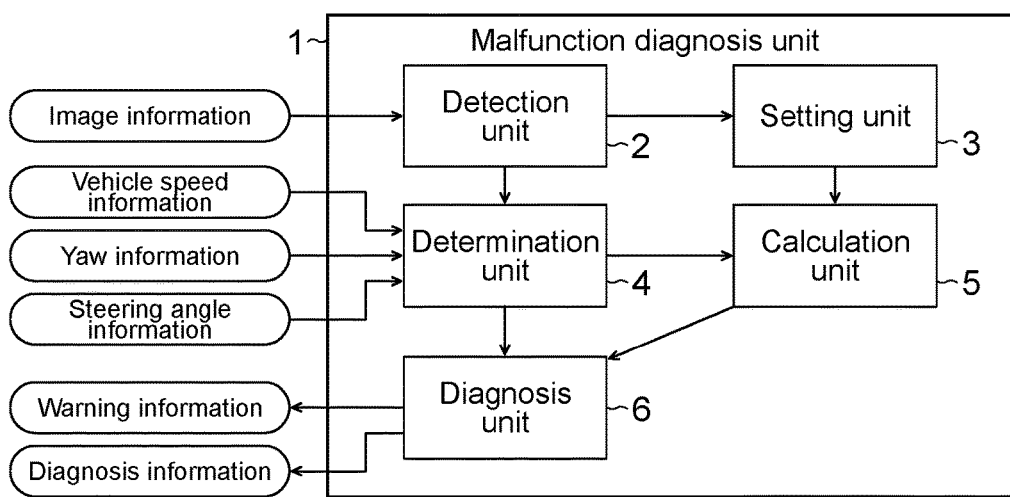
FIG. 3 is a block diagram schematically illustrating the functions of the malfunction diagnosis apparatus.

FIG. 3 is a block diagram for explaining a processing content for the malfunction diagnosis unit 1 with regard to malfunction diagnosis of the image recognition apparatus 10. The processing content for the malfunction diagnosis unit 1 is recorded (or saved) as an application program in the auxiliary storage apparatus 13 or the recording medium 17, for example. The processing content is extracted on the memory 12 or a memory space in the processor 11, and is executed. When the processing content in this case is classified in terms of functions, the malfunction diagnosis unit 1 is provided with a detection unit 2 (detection means), a setting unit 3 (setting means), a determination unit 4 (determination means), a calculation unit 5 (calculation means), and a diagnosis unit 6 (diagnosis means).

[3-1. Detection Unit]

The detection unit 2 performs detection by distinguishing a line of the road surface from the asphalt surface other than the line. In this case, a line printed on the road surface and the asphalt surface where no line is printed are identified on the image, and the identification result is transmitted to the setting unit 3 and the determination unit 4. Like the method for recognizing the recognition target object explained above, a publicly-known line recognition algorism may be employed for the identification of the line and the asphalt surface. Therefore, in a case where the image recognition apparatus 10 has already recognized the recognition target object, the line and the asphalt surface may be detected from the recognition result.

Figure 4:
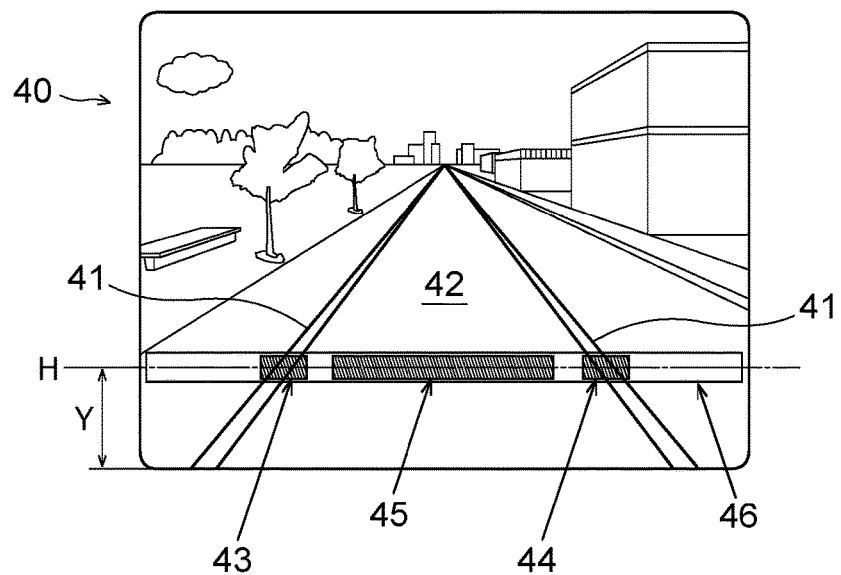
FIG. 4 is a figure illustrating an example of a first image in which a line is detected.
Figure 6:
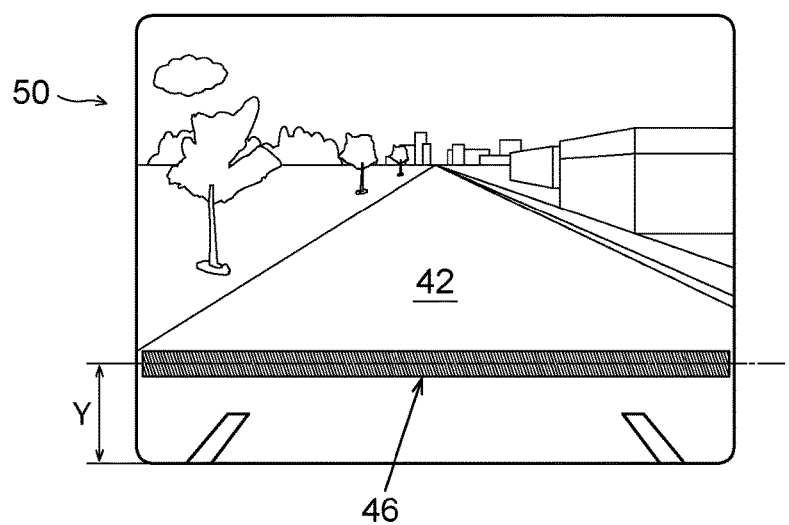
FIG. 6 is a figure illustrating an example of a second image in which any line is not detected.

Hereinafter, among the images captured by the on-board camera 21, an image in which a line has been detected will be referred to as "a first image 40", and an image in which no line has been detected will be referred to as "a second image 50". As illustrated in FIG. 4 and FIG. 6, a line and an asphalt surface existing in these images will be denoted with reference numerals 41 and 42, respectively, and will be explained.

[3-2. Setting Unit]

The setting unit 3 sets an area (define a region) adopted as the target of the malfunction diagnosis. In a case where the detection unit 2 detects a line, the setting unit 3 sets three types of areas 43, 44, and 45 with use of the first image 40. These areas 43 to 45 are set at the positions corresponding to a turning radius (curvature radius), an inclination, a cruising lane width, and the like on the road surface. On the other hand, in a case where the detection unit 2 does not detect any line, the setting unit 3 only sets a single type of area (third area 46). The positions of these areas 43 to 46 are illustrated in FIG. 4 and FIG. 6, for example.

The first areas 43, 44 are areas corresponding to the lines 41 in the first image 40 (more preferably, areas including much of the line 41). Since the lines 41 are arranged at the right and the left of the vehicle 20, the first area 43 corresponding to the line 41 at the left side and the first area 44 corresponding to the line 41 at the right side are defined. As illustrated in FIG. 4, the first areas 43, 44 are arranged in parallel with a gap in the horizontal direction along a virtual line H, a distance of which from the lower end side is a size Y in the rectangular image. The position of the line 41 in the first image 40 changes (fluctuates) in accordance with the turning radius, the inclination, and the cruising lane width, and the like of the road surface. Therefore, the positions of the first areas 43, 44 in the horizontal direction also change in accordance with the road.

The second area 45 is an area corresponding to the asphalt surface 42 in the first image 40 (more preferably, an area including much of the asphalt surface 42). In this case, an area including the central portion of the asphalt surface 42 serving as the cruising lane of the vehicle 20 is defined as the second area 45. The second area 45 in the present embodiment is defined as a belt-like region extending in the horizontal direction along the virtual line H in a range sandwiched by the right and left first areas 43, 44. As illustrated in FIG. 4, the horizontal width of the second area 45 is set so that a predetermined gap is left in the horizontal direction with respect to the right and the left first areas 43, 44.

The third area 46 is a large area including an area corresponding to three types of areas 43 to 45. In this case, a belt-like region extending in the horizontal direction along the virtual line H almost over the entire width of the rectangular image is defined as the third area 46. It should be noted that the position of the third area 46 may be set in advance. In a case where the first areas 43, 44 have already been set in advance, both of the right and the left end portions of the third area 46 may be shortened to such a degree that at least the first areas 43, 44 are included. Information about the positions of the areas 43 to 46 defined here is transmitted to the calculation unit 5.

[3-3. Determination Unit]

The determination unit 4 is configured to determine a condition about the malfunction diagnosis. In this case, a determination about a cruise state of the vehicle 20 and a determination about a detection state of the line 41 are carried out. The former determination is performed in order to carry out the malfunction diagnosis while the vehicle 20 is cruising. In a case where, for example, anyone of the following conditions is satisfied, the determination unit 4 determines that "the vehicle is cruising", and transmits the information to the calculation unit 5 and the diagnosis unit 6. A "predetermined speed" in the condition is a threshold for estimating whether the vehicle 20 is cruising the road on which the line 41 is drawn, and is, for example, a value corresponding to a legal limit speed (several dozen km/h).

- The vehicle speed is equal to or more than the predetermined speed
- The yaw rate is equal to or more than a predetermined value
- The steering angle is equal to or more than a predetermined angle The latter determination is performed in order to switch the method of the malfunction diagnosis. The determination unit 4 stores and holds information indicating whether the detection unit 2 has detected the line 41 or not, and transmits the information to the calculation unit 5 and the diagnosis unit 6. The time for which the information is continued to be stored and held is at least equal to or more than a time corresponding to a single calculation cycle, and is, more preferably, a time corresponding to several calculation cycles. More specifically, the determination unit 4 has a function of storing the fact that the line 41 was detected in the immediately close past.

The function for storing the above fact is useful to improve the malfunction diagnosis accuracy. This is because, when the line 41 was detected in the immediately close past (for example, in a previous calculation cycle), data freshness of the first areas 43, 44 and the second area 45 (the accuracy of the position where the region is set) is high, and the state of the road surface is not considered to have changed rapidly. The first areas 43, 44 and the second area 45 are set on the basis of the first image 40 obtained immediately before the malfunction diagnosis is carried out, so that a region which is highly possibly the line 41 or the asphalt surface 42 (for example, a road surface where the line 41 is difficult to be seen because of a puddle, a road surface where the marking of the line 41 is almost disappearing, and the like) can be adopted as a diagnosis target, and the diagnosis accuracy for diagnosing a malfunction is improved.

[3-4. Calculation Unit]

The calculation unit 5 calculates the brightness of each of the areas 43 to 46, which are set by the setting unit 3, using a second image 50 in which any line 41 has not been detected. In this case, the calculation unit 5 calculates average brightness levels $A_L$, $A_R$ (first brightness levels) of the first areas 43, 44, respectively, an average brightness level B (second brightness) of the second area 45, and an average brightness level C of the third area 46. The average brightness levels $A_L$, $A_R$ correspond to average brightness levels in "an area where the line 41 should have been detected in the first image 40 (an area in which the line 41 is not detected in the second image 50)".

Likewise, the average brightness level B corresponds to an average brightness level of "an area in which the asphalt surface 42 should have been detected in the first image 40". The average brightness level C corresponds to an average brightness level of "an area which is expected to correspond to the line 41 and the asphalt surface 42".

Various calculation methods for calculating the average brightness levels may be considered. For example, an arithmetic mean value of brightness levels of the pixels existing in each area may be calculated, or a geometric mean value thereof may be calculated. Alternatively, a value obtained by mixing the arithmetic mean value and the geometric mean value may be derived. Information about the brightness levels calculated here is transmitted to the diagnosis unit 6.

[3-5. Diagnosis Unit]

The diagnosis unit 6 carries out the malfunction diagnosis by using the brightness levels calculated by the calculation unit 5. In this malfunction diagnosis, the malfunction caused by an internal factor of the image processing system and a malfunction state including a reduction of performance due to an environmental factor are classified into three types to be determined. The implementation condition of the malfunction diagnosis is that the vehicle is in the cruising state and that the detection unit 2 is not detecting the line 41. The diagnosis unit 6 according to the present embodiment selects any one of the two malfunction diagnosis methods in accordance with whether the line 41 is detected or not in the previous calculation cycle. When making this selection, the diagnosis unit 6 refers to a detection history of the line 41 stored and held by the determination unit 4.

The first malfunction diagnosis method is selected when the line 41 is detected in the previous calculation cycle. In this case, the relationship in magnitude between each of the average brightness levels $A_L$, $A_R$ calculated by the calculation unit 5 and the underexposure threshold $K_1$ (first threshold) is compared, and the relationship in magnitude between the average brightness level B and the overexposure threshold $K_2$ (second threshold) is compared. The overexposure threshold $K_2$ has a value larger (brightness-level-higher) than the underexposure threshold $K_1$ ($K_1 < K_2$).

Figure 5A:
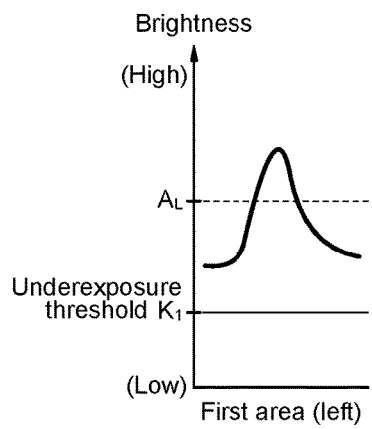
FIG. 5A is a graph illustrating an example of a brightness distribution of a first area in the first image.
Figure 5B:
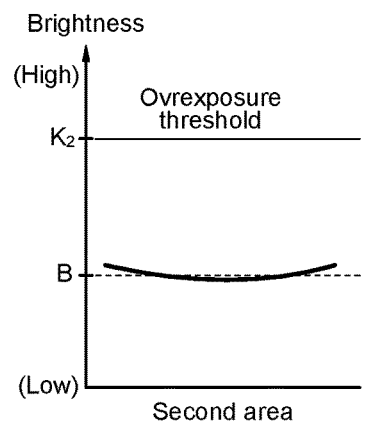
FIG. 5B is a graph illustrating an example of a brightness distribution of a second area.
Figure 5C:
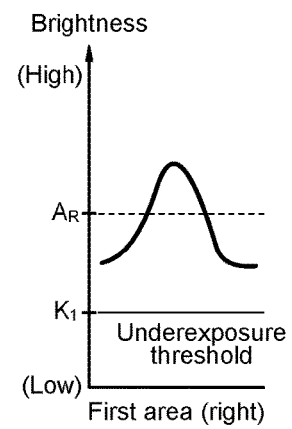
FIG. 5C is a graph illustrating an example of a brightness distribution of the first area in the first image.

In this case, in a case where the average brightness level $A_L$ is less than the underexposure threshold $K_1$, a malfunction "underexposure tendency" is determined to have occurred in the image processing system. Likewise, in a case where the average brightness level $A_R$ is less than the underexposure threshold $K_1$, a malfunction "underexposure tendency" is also determined to have occurred in the image processing system. In a case where the average brightness level B is more than the overexposure threshold $K_2$, a malfunction "overexposure tendency" is also determined to have occurred in the image processing system. On the other hand, as illustrated in FIGS. 5A to 5C, in a case where both of the average brightness levels $A_L$, $A_R$ are equal to or more than the underexposure threshold $K_1$, and the average brightness level B is equal to or less than the overexposure threshold $K_2$, a performance degradation is determined to have occurred in the image processing system.

The second malfunction diagnosis method is selected when the line 41 is not detected in the previous calculation cycle. In this case, the first areas 43, 44 and the second area 45 may not be set, and even if the first areas 43, 44 and the second area 45 are set, the information is considered to be a little bit obsolete. Therefore, the diagnosis unit 6 compares the relationship in magnitude between the average brightness level C calculated by the calculation unit 5 and the underexposure threshold $K_3$ (third threshold), and compares the magnitude in relationship between the average brightness level C and the overexposure threshold $K_4$ (fourth threshold). The overexposure threshold $K_4$ has a value more than the underexposure threshold $K_3$ (a value corresponding to a higher brightness level). The thresholds $K_3$, $K_4$ may be the same values as the thresholds $K_1$, $K_2$, respectively, or may be different values.

Figure 7:
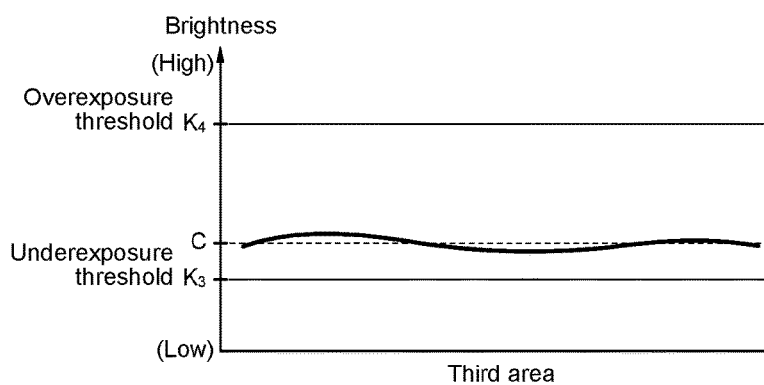
FIG. 7 is a graph illustrating an example of a brightness distribution of a third area in a second image.

In this case, in a case where the average brightness level C is less than the underexposure threshold $K_3$, a malfunction "underexposure tendency" is determined to have occurred in the image processing system. In a case where the average brightness level C is more than the overexposure threshold $K_4$, a malfunction "overexposure tendency" is determined to have occurred in the image processing system. On the other hand, as illustrated in FIG. 7, if the average brightness level C is equal to or more than the underexposure threshold $K_3$ but is equal to or less than the overexposure threshold $K_4$, a performance degradation is determined to have occurred in the image processing system.

The diagnosis unit 6 outputs the malfunction diagnosis code (diagnosis code) corresponding to the diagnosis result to the auxiliary storage apparatus 13 and the recording medium 17, and records the information thereof. The diagnosis unit 6 counts the number of times a malfunction diagnosis code of the same type is recorded, and when the number of times the malfunction diagnosis code of the same type is recorded is equal to or more than a predetermined number of times, the diagnosis unit 6 notifies the passenger of the warning information and the diagnosis information corresponding to the malfunction diagnosis code. These warning information and diagnosis information are displayed on the display 25, and output as audio guidance from the speaker 26.

Hereinafter, a relationship of a type of malfunction diagnosis code and a reason why the code is output will be illustrated for example. A malfunction diagnosis code 1 indicates that it is highly possible that a malfunction of underexposure tendency has occurred, and a malfunction diagnosis code 2 indicates that it is highly possible that a malfunction of overexposure tendency has occurred. These codes are output in accordance with not only a malfunction due to an internal factor of the image processing system but also a performance degradation due to an environmental factor. In contrast, a malfunction diagnosis code 3 indicates that it is highly possible that a performance degradation due to an environmental factor has occurred. Therefore, whether there is a malfunction due to an internal factor of the system can be accurately diagnosed by determining whether the type of the malfunction diagnosis code is the malfunction diagnosis code 3.

TABLE 1

| | Major reasons | |
|---|---|---|
| Type of code | Malfunction due to internal factor of system | Performance degradation due to environmental factor |
| Malfunction diagnosis code 1 | Camera exposure malfunction (underexposure tendency). | Lens smear of on-board camera. Smear on window surface. Backlight. Tunnel entrance. |
| Malfunction diagnosis code 2 | Camera exposure malfunction (overexposure tendency). | Tunnel exit. |
| Malfunction diagnosis code 3 | — | Line is almost disappearing. No line. Occurrence of fog. Rainfall. Snow. |

The specific values of the thresholds $K_1$, $K_2$, $K_3$, $K_4$ used in the above malfunction diagnosis may be fixed values defined in advance, or may be calculation values derived as necessary.

Figure 8:
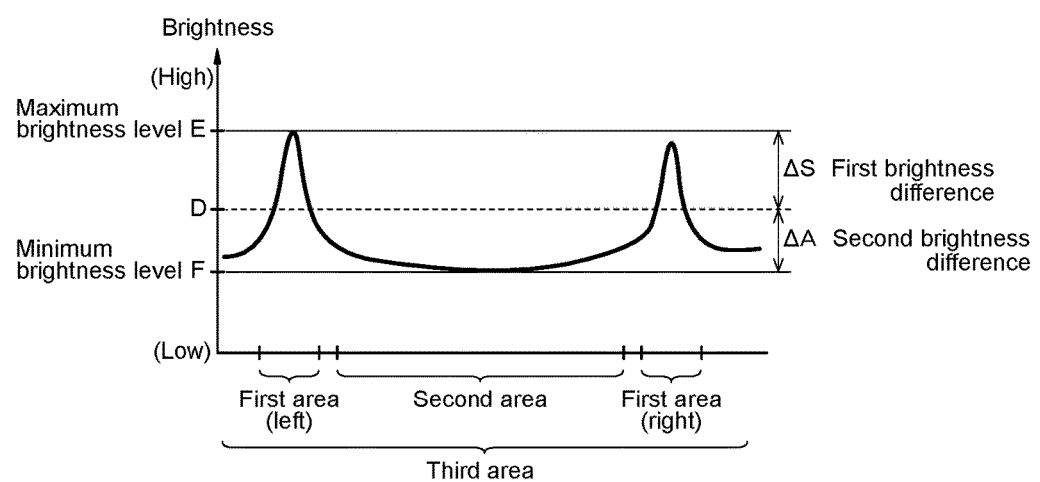
FIG. 8 is a graph for explaining a method for setting a threshold.

For example, the thresholds $K_1$, $K_2$ are considered to be set on the basis of the first image 40 that is referred to when the first areas 43, 44 and the second area 45 are set. In this case, as illustrated in FIG. 8, a maximum brightness level E (line brightness maximum value) of the first areas 43, 44 is calculated, and the minimum brightness F (asphalt brightness minimum value) of the second area 45 is calculated. Values obtained by multiplying the minimum brightness F and the maximum brightness level E by constants $\eta$, $\gamma$ which give a predetermined margin may function as thresholds $K_1$, $K_2$, respectively (underexposure threshold $K_1 = F \times \eta$, overexposure threshold $K_2 = E \times \gamma$). The values of the constants $\gamma$, $\eta$ can be obtained in advance through examinations and experiments.

The thresholds $K_3$, $K_4$ may be set on the basis of the first image 40. In this case, a difference between an average brightness D of the third area 46 in the first image 40 and the maximum brightness level E (line brightness maximum value) is derived as a first brightness difference $\Delta S$, and a difference between the average brightness D and the minimum brightness F (asphalt brightness minimum value) is derived as a second brightness difference $\Delta A$. A value obtained by multiplying the second brightness difference $\Delta A$ by a constant $\beta$ and subtracting the product from the average brightness D may function as an underexposure threshold $K_3$ (underexposure threshold $K_3 = D - \Delta A \times \beta$). Likewise, a value obtained by multiplying the first brightness difference $\Delta S$ by a constant $\alpha$ which gives a predetermined margin and adding the product with the average brightness D may function as an overexposure threshold $K_4$ (an overexposure threshold $K_4 = D + \Delta S \times \alpha$).

[4. Flowchart]

Figure 9A:
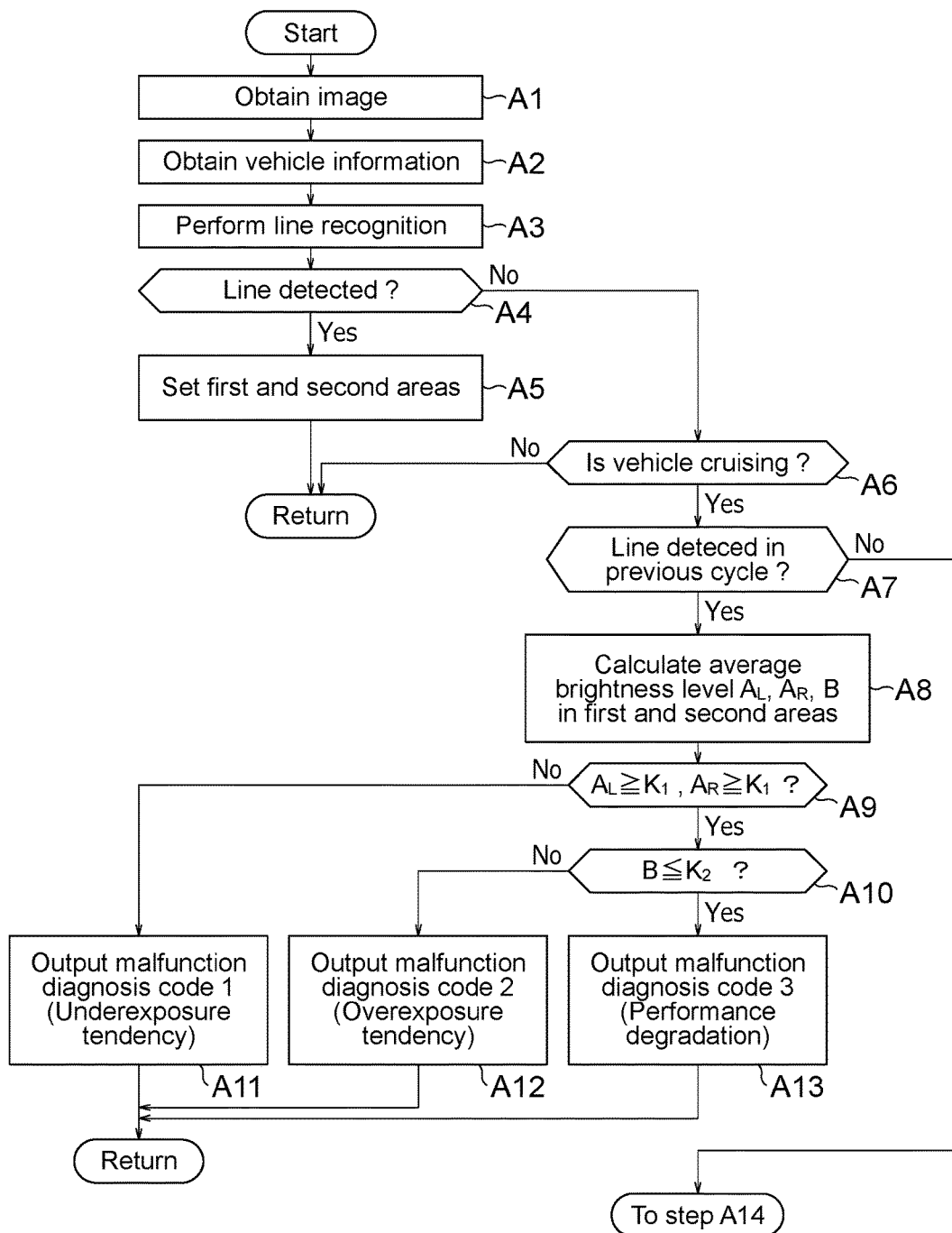
FIGS. 9 (9A and 9B) is a flowchart illustrating an example of a control procedure with the malfunction diagnosis apparatus.
Figure 9B:
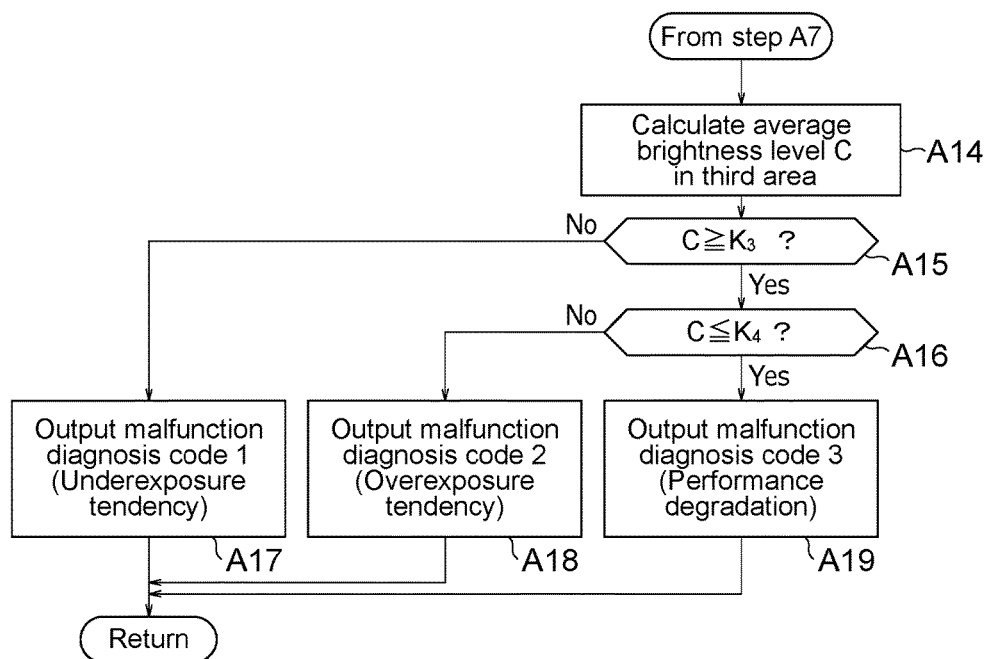

FIGS. 9 (9A and 9B) is a flowchart illustrating an example of a procedure of a malfunction diagnosis program executed by the malfunction diagnosis unit 1. This flow is recorded (or saved), for example, as an application program in the auxiliary storage apparatus 13 and the recording medium 17, and when the program is executed, the program is read by the processor 11, and is executed repeatedly with a predetermined cycle.

The image recognition apparatus 10 obtains the image captured by the on-board camera 21 (step A1), and obtains information about the vehicle speed detected by the vehicle speed sensor 22 (step A2). At this occasion, vehicle information about the cruise state of the vehicle 20 such as the yaw rate detected by the yaw rate sensor 23, the steering angle detected by the steering angle sensor 24, and the like may be obtained. The image recognition apparatus 10 recognizes a recognition target object around the vehicle 20 by applying analysis processing to the image (step A3). In this case, at least the line 41 and the asphalt surface 42 on the road surface are identified.

In step A4, the detection unit 2 identifies the line 41 and the asphalt surface 42 in the image, and determines whether the line 41 has been detected or not. In this case, in a case where the line 41 is detected, step A5 is subsequently executed, and in a case where the line 41 is not detected, step A6 is subsequently executed. In step A5, the setting unit 3 sets the first areas 43, 44 and the second area 45 which are the target of the malfunction diagnosis. The coordinates in the vertical axis direction of these areas 43 to 45 are fixed at the position of the virtual line H as illustrated in FIG. 4.

In a case where the thresholds $K_1$, $K_2$ used in steps A9 to A10 explained later are set on the basis of the first image 40, the underexposure threshold $K_1$ and the overexposure threshold $K_2$ are calculated here. The underexposure threshold $K_1$ is a value obtained by multiplying the minimum brightness F of the second area 45 in the first image 40 by a constant $\eta$. The overexposure threshold $K_2$ is a value obtained by multiplying the maximum brightness level E of the first areas 43, 44 in the first image 40 by the constant $\gamma$. Thereafter, without carrying out the malfunction diagnosis, the processing in this calculation cycle is terminated, and in the subsequent calculation cycle, the processing is started from step A1 again. Therefore, while the line 41 is recognized, the positions of the first areas 43, 44 and the second area 45 are repeatedly updated with a predetermined cycle. On the other hand, when the line 41 is no longer detected, the processing in step A6 and subsequent steps is executed.

In step A6, the determination unit 4 determines whether the vehicle 20 is cruising or not. In this case, for example, when the vehicle speed is equal to or more than a predetermined speed, the vehicle 20 is determined to be cruising a road in which there is a line, and step A7 is subsequently executed. On the other hand, in a case where the vehicle speed is less than a predetermined speed, the vehicle 20 is determined to be cruising a road in which there is no line (for example, the vehicle 20 is cruising a narrow private path or street), and therefore the processing in this calculation cycle is terminated. Instead of determining the vehicle speed, the magnitude of the steering angle or the yaw rate of the vehicle 20 may be determined to be equal to or more than a predetermined value.

In step A7, the determination unit 4 determines whether the line 41 is detected in the previous calculation cycle. When this condition is satisfied, step A8 is subsequently executed, and the second image 50 obtained in this calculation cycle is adopted as the target, and the calculation unit 5 calculates the average brightness levels $A_L$, $A_R$, B of the first areas 43, 44 and the second area 46, respectively.

In step A9, the diagnosis unit 6 determines whether both of the average brightness levels $A_L$, $A_R$ of the first areas 43, 44 are equal to or more than the underexposure threshold $K_1$ or not. It should be noted that the average brightness levels $A_L$, $A_R$ of the first areas 43, 44 tend to attain a value higher than the average brightness level B of the second area 45. Therefore, in order to make it less likely to make an erroneous determination in the determination using the underexposure threshold $K_1$ corresponding to a relatively low brightness level, it is more advantageous to use the average brightness levels $A_L$, $A_R$ of the first areas 43, 44 rather than using the average brightness level B of the second area 45. In this case, in a case where any one of the average brightness levels $A_L$, $A_R$ is less than the underexposure threshold $K_1$, step A11 is subsequently executed, and the diagnosis unit 6 outputs the malfunction diagnosis code 1, and the processing in this calculation cycle is terminated. On the other hand, when both of the average brightness levels $A_L$, $A_R$ are equal to or more than the underexposure threshold $K_1$, step A10 is subsequently executed.

In step A10, a determination is made as to whether the average brightness level B of the second area 45 is equal to or less than the overexposure threshold $K_2$. The average brightness level B of the second area 45 tends to attain a value lower than the average brightness levels $A_L$, $A_R$ of the first areas 43, 44. Therefore, in order to make it less likely to make an erroneous determination in the determination using the overexposure threshold $K_2$ corresponding to a relatively high brightness level, it is more advantageous to use the average brightness level B of the second area 45 rather than using the average brightness levels $A_L$, $A_R$ of the first areas 43, 44. In this case, in a case where the average brightness level B is more than the overexposure threshold $K_2$, step A12 is subsequently executed, and the diagnosis unit 6 outputs the malfunction diagnosis code 2, and the processing in this calculation cycle is terminated. On the other hand, when the average brightness level B is equal to or less than the overexposure threshold $K_2$, step A13 is subsequently executed, the diagnosis unit 6 outputs the malfunction diagnosis code 3, and the processing in this calculation cycle is terminated.

On the other hand, in a case where the line 41 is not detected in the previous calculation cycle in step A7, step A14 is subsequently executed, and the second image 50 obtained in this calculation cycle is adopted as the target, and the calculation unit 5 calculates the average brightness level C of the third area 46. In a case where the threshold $K_3$, $K_4$ used in steps A15 to A16 subsequent thereto are set on the basis of the first image 40 immediately before, the underexposure threshold $K_3$ and the overexposure threshold $K_4$ are calculated here. The underexposure threshold $K_3$ is calculated on the basis of the minimum brightness F and the average brightness D of the third area 46 in the first image 40 immediately before. Likewise, the overexposure threshold $K_4$ is calculated on the basis of the average brightness D and the maximum brightness level E.

In step A15, the diagnosis unit 6 determines whether the average brightness level C of the third area 46 is equal to or more than the underexposure threshold $K_3$ or not. In this case, in a case where the average brightness level C is less than the underexposure threshold $K_3$, step A17 is subsequently executed, and the diagnosis unit 6 outputs the malfunction diagnosis code 1, and the processing in this calculation cycle is terminated. In a case where the average brightness level C is equal to or more than the underexposure threshold $K_3$, step A16 is subsequently executed, and a determination is made as to whether the average brightness level C is equal to or less than the overexposure threshold $K_4$. In this case, in a case where the average brightness level C is more than the overexposure threshold $K_4$, step A18 is subsequently executed, and the diagnosis unit 6 outputs the malfunction diagnosis code 2, and the processing in this calculation cycle is terminated. On the other hand, when the average brightness level C is equal to or less than the overexposure threshold $K_4$, step A19 is subsequently executed, the diagnosis unit 6 outputs the malfunction diagnosis code 3, and the processing in this calculation cycle is terminated. Such processing is repeated, and thereafter, when the number of outputs of any given malfunction diagnosis code attains a predetermined number of times, warning information and diagnosis information corresponding to the malfunction diagnosis code are transmitted to the display 25 and the speaker 26, and are notified to the passenger.

[5. Actions and Effects]

(1) The above malfunction diagnosis unit 1 (or the image recognition apparatus 10 including the malfunction diagnosis unit 1) sets the first areas 43, 44 and the second area 45 on the basis of the first image 40 captured while the line 41 is detected. Thereafter, when the line 41 is no longer detected, the average brightness levels $A_L$, $A_R$ of the first areas 43, 44 in the second image 50 and the average brightness level B of the second area 45 are calculated. By determining the malfunction on the basis of the average brightness levels $A_L$, $A_R$, B, a region which is highly possibly a line or an asphalt surface can be adopted as the diagnosis target region, and the malfunction diagnosis accuracy can be improved. As illustrated in table 1, the malfunction diagnosis unit 1 can perform diagnosis upon identifying a malfunction due to an internal factor of the system and a performance degradation due to an environmental factor, and therefore, the malfunction diagnosis accuracy can be improved.

(2) In a case where each of the average brightness levels $A_L$, $A_R$ of the first areas 43, 44 is less than the underexposure threshold $K_1$ in a determination made on the basis of the brightness level, the malfunction diagnosis unit 1 determines that a malfunction "underexposure tendency" has occurred in the image processing system. As described above, an erroneous determination caused by underexposure (i.e., being too dark) can be suppressed by determining a relationship in magnitude between the average brightness levels $A_L$, $A_R$ which are likely to have a relatively large brightness value and the underexposure threshold $K_1$ corresponding to a relatively small brightness level.

In a case where the average brightness level B of the second area 45 is more than the overexposure threshold in the determination made on the basis of the brightness level, the malfunction diagnosis unit 1 determines that a malfunction "overexposure tendency" has occurred in the image processing system. As described above, an erroneous determination caused by overexposure (i.e., being too bright) can be suppressed by determining a relationship in magnitude between the average brightness level B which is likely to have a relatively small brightness value and the overexposure threshold $K_2$ corresponding to a relatively large brightness level.

Therefore, an occurrence of an erroneous determination for determining a malfunction in the exposure can be suppressed, and the malfunction diagnosis accuracy can be improved.

(3) The underexposure threshold $K_1$ used in the malfunction diagnosis can be set in accordance with the minimum brightness F (asphalt brightness minimum value) of the second area 45 in the first image 40. In this case, the underexposure threshold $K_1$ can be given on the basis of the actually measured value of the asphalt surface 42 in a cruising scene when the line 41 is detected, and a malfunction diagnosis on the basis of an environment of the cruising scene can be realized. Therefore, a determination can be accurately made as to whether the first areas 43, 44 is underexposed or not without being affected by the amount of solar radiation and the time zone, and the malfunction diagnosis accuracy of the image processing system can be further improved.

(4) Likewise, the overexposure threshold $K_2$ used in the malfunction diagnosis of this application can be set in accordance with the maximum brightness level E (line brightness maximum value) of the first areas 43, 44 in the first image 40. In this case, the overexposure threshold $K_2$ can be given on the basis of the actually measured value of the line 41 in the cruising scene when the line 41 is detected. Therefore, a determination can be accurately made as to whether the second area 45 is overexposed or not, and the malfunction diagnosis accuracy of the image processing system can be further improved.

(5) The malfunction diagnosis unit 1 sets not only the first areas 43, 44 and the second area 45 but also the third area 46. As illustrated in FIGS. 4 and 6, this third area 46 is set as a large area including areas corresponding to the right and left first areas 43, 44 and the second area 45. The calculation unit 5 calculates the average brightness level C of the third area 46, and carries out the malfunction diagnosis on the basis of the average brightness level C. The determination method explained above is employed, and therefore, even in a case where the line 41 is not detected in the previous calculation cycle, the average brightness level C in the area that should be the line 41 and the asphalt surface 42 can be diagnosed, and the malfunction diagnosis accuracy can be improved.

(6) In a case where the average brightness level C of the third area 46 is less than the underexposure threshold $K_3$, the malfunction diagnosis unit 1 determines that a malfunction "underexposure tendency" has occurred in the image processing system. In a case where the average brightness level C is more than the overexposure threshold $K_4$, the malfunction diagnosis unit 1 determines that a malfunction "overexposure tendency" has occurred in the image processing system. Therefore, the malfunction determination can be performed while the line 41 is not detected. An erroneous detection caused by an exposure state of the on-board camera 21 can be suppressed, and the malfunction determination accuracy can be improved.

(7) The underexposure threshold $K_3$ and the overexposure threshold $K_4$ used in the malfunction diagnosis are set in accordance with the average brightness D in the third area 46, the minimum brightness F in the second area 45, and the maximum brightness level E of the first areas 43, 44 in the first image 40 immediately before. Therefore, even if the line 41 is not detected in the past (for example, in the previous calculation cycle), the thresholds $K_3$, $K_4$ based on the environment of the cruising scene can be given, and the malfunction diagnosis accuracy of the image processing system can be further improved.

(8) The above malfunction diagnosis unit 1 carries out the malfunction diagnosis on condition that the vehicle 20 is cruising. For example, when the vehicle speed is equal to or more than a predetermined vehicle speed, the vehicle 20 is determined not to be cruising a narrow private path or street but is determined to be cruising the road on which the line 41 is drawn, and accordingly the malfunction diagnosis is carried out. Therefore, the road surface environment suitable for the diagnosis can be identified, and the malfunction diagnosis accuracy can be further improved.

In a state where the vehicle speed is less than a predetermined vehicle speed, the malfunction diagnosis is not carried out. Therefore, for example, an erroneous diagnosis based on an indication marks other than the line 41 pained on a road surface of a parking lot or a gas station can be prevented. With regard to these features, adopting a condition that "the vehicle speed of the vehicle is equal to or more than a predetermined vehicle speed" as one of the implementation conditions of the malfunction diagnosis also contributes to the improvement of the malfunction diagnosis accuracy.

(9) In the malfunction diagnosis unit 1, a condition that the yaw rate is equal to or more than a predetermined value and a condition that a steering angle is equal to more than a predetermined angle are also used as one (s) of the implementation conditions of the malfunction diagnosis. As described above, in a turning state in which the steering angle and the yaw rate of the vehicle 20 are high, the vehicle 20 is estimated to be cruising a road having a line. Therefore, the malfunction diagnosis accuracy can be further improved.

[6. Modification]

In the above embodiment, for example, the malfunction diagnosis unit 1 is provided inside of the image recognition apparatus 10. Alternatively, the malfunction diagnosis unit 1 may be provided outside of the image recognition apparatus 10. For example, the malfunction diagnosis unit 1 may be arranged in the vehicle control apparatus 30, or the malfunction diagnosis unit 1 may be provided as a single independent electronic control apparatus. In a case where the vehicle 20 is provided with a wireless communication function, the malfunction diagnosis unit 1 can be provided in the computer or the server on the network. Further, the functions for realizing the malfunction diagnosis unit 1 can be arranged in a distributed manner in multiple electronic control apparatuses.

In the above embodiment, for example, the vehicle speed, the yaw rate, and the steering angle are used in the determination of the cruise state of the vehicle 20, but various kinds of specific parameters for this determination may be considered. For example, in a case where the rotation speed, the torque of an engine or motor provided in the vehicle 20, the rotation speed of the driving shaft, the torque of the driving shaft, and the like are equal to or more than predetermined values, it may be determined that "the vehicle is cruising". Alternatively, a turning state may be determined on the basis of the lateral acceleration and the steering angle of the driving wheels of the vehicle 20.

In the above embodiment, for example, as illustrated in steps A9, A10 of FIG. 9A, the malfunction diagnosis method using both of the average brightness levels $A_L$, $A_R$ of the first areas 43, 44 and the average brightness level B of the second area 45 has been illustrated as an example. Alternatively, a malfunction diagnosis may be performed by using one of the average brightness levels $A_L$, $A_R$ of the first areas 43, 44 and the average brightness level B of the second area 45. Further, in the above embodiment, the first area 43 corresponding to the line 41 at the left side and the first area 44 corresponding to the line 41 at the right side are defined. Alternatively, any one of the first area 43 corresponding to the line 41 at the left side and the first area 44 corresponding to the line 41 at the right side may be defined. When at least one or more pieces of average brightness information are used, a state corresponding to the malfunction diagnosis code 1 or 2 in the table 1 and a state corresponding to the malfunction diagnosis code 3 can be identified, and the malfunction diagnosis accuracy can be improved.

As described above, according to the technique in the disclosure, the malfunction diagnosis accuracy of the image processing system can be improved.

[7. Supplemental Note]

The supplemental notes are disclosed with regard to the embodiment including the above modification.

APPENDIX

It is preferable for the first brightness level and the second brightness level to be calculated when the line is detected in the previous calculation cycle.

The diagnosis unit preferably performs the malfunction diagnosis by comparing at least one of the first brightness and the second brightness and the threshold. In this case, it is preferable to determine whether the first brightness and the second brightness are within a predetermined range.

Further, the diagnosis unit preferably diagnoses a malfunction state including a malfunction due to an internal factor of the system and a performance degradation due to an environmental factor. The diagnosis unit preferably identifies a malfunction due to the internal factor and a performance degradation due to an environmental factor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claims is:

1. A malfunction diagnosis apparatus diagnosing a malfunction of a system for processing an image captured by an on-board camera, and including a processor configured to cause performance of operations, the operations comprising:
    detecting, in a first image captured by a vehicle and using a line recognition algorithm, a plurality of lines printed on a road surface;
    detecting, in the first image, a portion of the road surface with no line printed thereon;
    setting, in response to the plurality of lines being detected in the first image in which the plurality of lines are detected, a plurality of first areas that each include a corresponding line of the plurality of detected lines, the plurality of first areas being arranged in parallel with a gap therebetween in a horizontal direction;
    setting a second area within the gap that corresponds to the detected portion with no line printed thereon;
    transmitting information about positions of the second area and the plurality of first areas; and
    in response to the plurality of lines being detected in the first image and in response to one or more of the plurality of lines not being detected in a second image that is captured by the vehicle after the first image is captured and that is captured while the vehicle is cruising:
        calculating, using the information about the positions of the second area and the plurality of first areas, a first brightness in a plurality of first areas of the second image having positions corresponding to the positions of the plurality of first areas of the first image by calculating an average value of brightness of each pixel included in the plurality of the first areas of the second image, and a second brightness in a second area of the second image having a position corresponding to the position of the second area of the first image by calculating an average value of brightness of each pixel included in the second area of the second image; and
        diagnosing the malfunction using the first brightness and the second brightness.

2. The malfunction diagnosis apparatus according to claim 1, wherein the operations further comprise:
    diagnosing that the malfunction has occurred if the first brightness is less than a first threshold or the second brightness is more than a second threshold, the second threshold being set larger than the first threshold.

3. The malfunction diagnosis apparatus according to claim 2, wherein the first threshold is set using a minimum brightness of the second area in the first image.

4. The malfunction diagnosis apparatus according to claim 2, wherein the second threshold is set using a maximum brightness of one or more of the plurality of first areas in the first image.

5. The malfunction diagnosis apparatus according to claim 1, wherein, the operations further comprise:
    storing information representing whether or not the line was detected in immediately close past;
    in response to the plurality of lines printed on the road being detected in immediately close past with reference to the information representing whether or not the line was detected in immediately close pas and in response to the plurality of lines not being detected in the second image,
    calculating, using the information about positions of the second area and the plurality of first areas, the first brightness and the second brightness;
    diagnosing the malfunction using the first brightness and the second brightness; and
    in response to the plurality of lines printed on the road not being detected in immediately close past:
        calculating an average brightness of a third area using the second image, the third area being set to include both the plurality of first areas and the second area, and
        diagnosing the malfunction using the average brightness.

6. The malfunction diagnosis apparatus according to claim 5, wherein, the operations further comprise:
    diagnosing that the malfunction has occurred if the average brightness is less than a third threshold or the average brightness is more than a fourth threshold, the fourth threshold being set larger than the third threshold.

7. The malfunction diagnosis apparatus according to claim 6, wherein the third threshold and the fourth threshold are set, using the first image immediately before, using a maximum brightness of one or more of the plurality of first areas, a minimum brightness of the second area, and the average brightness of the third area.

8. The malfunction diagnosis apparatus according to claim 1, wherein:
    an implementation condition of the malfunction diagnosis is that a vehicle speed is equal to or more than a predetermined speed.

9. The malfunction diagnosis apparatus according to claim 1, wherein:
an implementation condition of the malfunction diagnosis is that a magnitude of a steering angle or a yaw rate of the vehicle is equal to or more than a predetermined value.

10. The malfunction diagnosis apparatus according to claim 1, wherein the operations further comprise:
determining whether one or more lines of the plurality of lines have been detected or not previously.

11. A non-transitory computer-readable recording medium storing a malfunction diagnosis program for diagnosing a malfunction of a system for processing an image captured by an on-board camera, the program causing a computer to execute operations comprising:
detecting, in a first image captured by a vehicle and using a line recognition algorithm, a plurality of lines printed on a road surface;
detecting, in the first image, a portion of the road surface with no line printed thereon;
setting, in response to the plurality of lines being detected in the first image in which the plurality of lines are detected, a plurality of first areas that each include a corresponding line of the plurality of detected lines, the plurality of first areas being arranged in parallel with a gap therebetween in a horizontal direction;
setting a second area within the gap that corresponds to the detected portion with no line printed thereon;
transmitting information about positions of the second area and the plurality of first areas;
in response to the plurality of lines being detected in the first image and in response to one or more of the plurality of lines not being detected in a second image that is captured by the vehicle after the first image is captured and that is captured while the vehicle is cruising:
calculating, using the information about the positions of the second area and the plurality of first areas, a first brightness in a plurality of first areas of the second image having positions corresponding to the positions of the plurality of first areas of the first image by calculating an average value of brightness of each pixel included in the plurality of first areas of the second image, and a second brightness in a second area of the second image having a position corresponding to the position of the second area of the first image by calculating an average value of brightness of each pixel included in the second area of the second image; and
diagnosing the malfunction using at least one of the first brightness and the second brightness.

* * * * *